(No Model.)
W. A. WAIN.
SHAFT COUPLING.
No. 269,608.　　　　　　　　Patented Dec. 26, 1882.
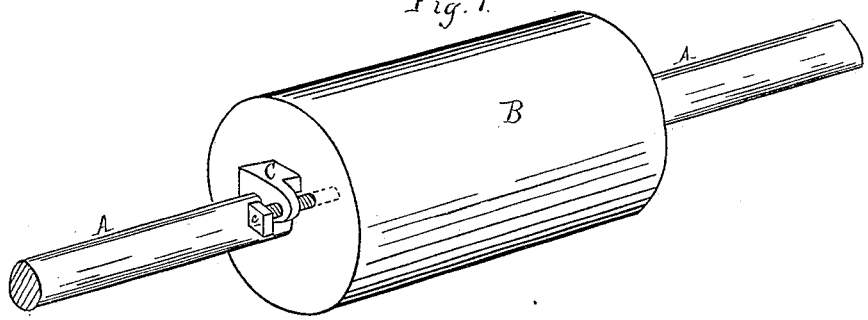
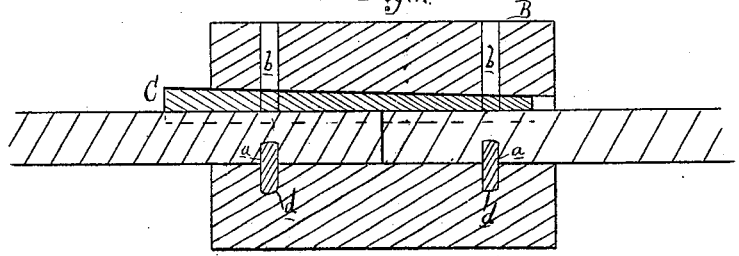
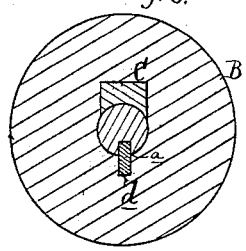
Attest:
A. J. Sprague
A. Barthel
Inventor:
William A. Wain
By Thos. S. Sprague
Att'ys.

UNITED STATES PATENT OFFICE.

WILLIAM A. WAIN, OF DETROIT, MICHIGAN.

SHAFT-COUPLING.

SPECIFICATION forming part of Letters Patent No. 269,608, dated December 26, 1882.

Application filed November 8, 1882. (No model.)

*To all whom it may concern:*

Be it known that I, WILLIAM A. WAIN, of Detroit, in the county of Wayne and State of Michigan, have invented new and useful Improvements in Shaft-Couplings; and I do hereby declare that the following is a full, clear, and exact description thereof, reference being had to the accompanying drawings, which form a part of this specification.

The nature of this invention relates to certain new and useful improvements in shaft-coupling, by means of which the two adjoining ends of sections of shaft in line are rigidly held in such line and in place, while the coupling itself may be used as a pulley, if desired.

The invention consists in the peculiar construction and combination of parts, as more fully hereinafter set forth.

Figure 1 is a perspective view of my improved shaft-coupling. Fig. 2 is a central vertical longitudinal section. Fig. 3 is a vertical cross-section of the coupling detached.

In the accompanying drawings, which form a part of this specification, A A represent the abutting ends of two sections of line-shafting which it is desired to couple together. Near each of the abutting ends of the shaft-sections there is drilled or cast a hole, *a*.

B is a joint, which may be made in the form of a pulley, if desired, the center of which in casting is cored out with a D-shaped core to form an orifice, as shown in Fig. 3, the circular part of the hole being in the same position with relation to the axis of the coupling as it would be if the hole itself was cast round. Holes *b* are tapped through the wall on the flat side of the central opening and into the bottom or circular part of such opening.

C is a key, the upper face and sides of which are designed to fit in the rectangular part of the hole or opening through the tube, while its inner face is made concave, so that when this key is inserted it leaves the hole through the hub or coupling round. Into the flat side of this key are tapped two holes coincident with the holes in the coupling, and when the key is inserted screws are inserted to hold the same in place, such screws passing through the holes in the coupling into the back of the key. The coupling is now ready for boring in the usual manner, so that the same may be fitted properly to the sections of the shaft. The outer end of this key is provided with a flange turning at right angles thereto, and through this flange there is a hole, through which a set-screw, *c*, engaging with the end of the coupling or hub, will hold the key in place. Of course, after the hub or coupling is bored out the screws which hold the key in place for that purpose are removed, so that the key may be easily taken out, when the two ends of the shaft are inserted until the holes therein engage with pins *d*, which are secured in the bottom of the holes which were drilled through the flat part of the opening and into the bottom. The two ends of the shafts having been thus engaged, the key is inserted and driven tightly into its place, where it is held by the set-screw, thereby forming a very rigid joint, but one that is easily taken apart and reconstructed.

What I claim as my invention is—

1. In a shaft-coupling, a hub wherein the central hole is formed partially by the inner wall of the hub itself and partially by the inner side of key, which is fitted to place by being bored simultaneously with the hub, substantially as described.

2. In a shaft-coupling, and in combination with abutting ends of sections of shafting which are provided with holes or recesses, as described, a coupling the bore of which is provided with inwardly-projecting pins to engage with said holes in the shafting, and a key secured in place by a set-screw, substantially as specified.

WM. A. WAIN.

Witnesses:
H. S. SPRAGUE,
A. BARTHEL.